(12) United States Patent
Runkel

(10) Patent No.: US 7,901,760 B2
(45) Date of Patent: Mar. 8, 2011

(54) LAMINATE ASSEMBLY AND METHOD OF MANUFACTURE

(75) Inventor: Kathy Runkel, Dallas, TX (US)

(73) Assignee: Heartvision Enterprises, Inc., Irving, TX (US)

( * ) Notice: Subject to any disclaimer, the term of this patent is extended or adjusted under 35 U.S.C. 154(b) by 883 days.

(21) Appl. No.: 10/984,029

(22) Filed: Nov. 8, 2004

(65) Prior Publication Data

US 2005/0276957 A1  Dec. 15, 2005

Related U.S. Application Data

(60) Provisional application No. 60/519,180, filed on Nov. 11, 2003.

(51) Int. Cl.
*B32B 5/16* (2006.01)

(52) U.S. Cl. ......... 428/206; 428/204; 428/141; 428/156; 428/143; 428/105; 264/1.7

(58) Field of Classification Search .................. 428/141, 428/105, 143, 156; 264/1.7
See application file for complete search history.

(56) References Cited

U.S. PATENT DOCUMENTS

| 4,005,538 | A | * | 2/1977 | Tung ............................... 40/564 |
| 4,505,967 | A | * | 3/1985 | Bailey ........................... 428/164 |
| 4,756,951 | A | * | 7/1988 | Wang et al. .................... 428/204 |
| 4,916,007 | A | * | 4/1990 | Manning et al. .............. 428/203 |
| 5,045,755 | A |   | 9/1991 | Appelberg |
| 5,128,783 | A | * | 7/1992 | Abileah et al. ................ 349/162 |
| 5,230,942 | A | * | 7/1993 | Courtoy et al. ............... 428/143 |
| 5,342,653 | A | * | 8/1994 | Simon et al. .................. 427/256 |
| RE34,742  | E |   | 9/1994 | Maier et al. |
| 5,411,352 | A |   | 5/1995 | Eren |
| RE35,132  | E |   | 12/1995 | Bay et al. |
| 5,508,103 | A |   | 4/1996 | Cope |
| 5,988,822 | A | * | 11/1999 | Abe et al. ...................... 359/541 |
| 6,723,392 | B1 | * | 4/2004 | Jinnai et al. ................... 428/1.1 |
| 6,773,787 | B2 | * | 8/2004 | Maas et al. ..................... 428/141 |
| 6,841,237 | B2 | * | 1/2005 | Murata et al. ................. 428/323 |
| 2004/0121089 | A1 |   | 6/2004 | Whiting |
| 2006/0046017 | A1 |   | 3/2006 | Adickes |

FOREIGN PATENT DOCUMENTS

GB      2347487 A  *  9/2000

OTHER PUBLICATIONS

Custom Quality Marble, Inc, "Customstone Solid Surface", World Wide Web, http://customqualitymarble.com/R1/customstone.htm, printed on Aug. 29, 2003, 2 pages.
Klein's Tri-Cove Company, "Solid Surface Products", World Wide Web, http://www.kitchenandbath.com/solid_surface.asp, printed on Aug. 29, 2003, 5 pages.
McCreary, Michael, "Delightful Dining", The Robb Report Collection, May 2003, p. 21.

(Continued)

*Primary Examiner* — Bruce H. Hess
*Assistant Examiner* — Tamra L Amakwe
(74) *Attorney, Agent, or Firm* — Stephen J. Walder, Jr.

(57) ABSTRACT

A laminate assembly comprises a base layer, a substantially transparent inclusion layer disposed above the base layer and having a plurality of included objects disposed within the inclusion layer, and a substantially transparent top layer disposed above the inclusion layer. The base layer, inclusion layer, and top layer are formed in succession.

30 Claims, 4 Drawing Sheets

OTHER PUBLICATIONS

Soma Industries, Inc., "Solid Surface Design / Product Guide", vol. 1, 2001, 12 pages.
The Virtual Showroom, "Solid Face", World Wide Web, http://www.thevirtualshowroom.com/SldSur/solid_surface.htm, printed on Aug. 29, 2003, 2 pages.
Translucent Panels and Material Solutions, 3form, Inc., www.3-form.com, Accessed Jun. 17, 2010.
INTERIORDESIGN.NET, Dec. 2008, p. 166.
INTERIORDESIGN.NET, Dec. 2008, p. 171.
Livinglass™ Brochure, Livinglass, Inc., Jul. 2007, 20 pages.
Lumicor® Brochure, Lumicor, Inc., 2007, 28 pages.
Kitchen & Bath Design News, Oct. 2008, p. 85.
At One with DuPont™ Corian, 2006, 6 pages.

* cited by examiner

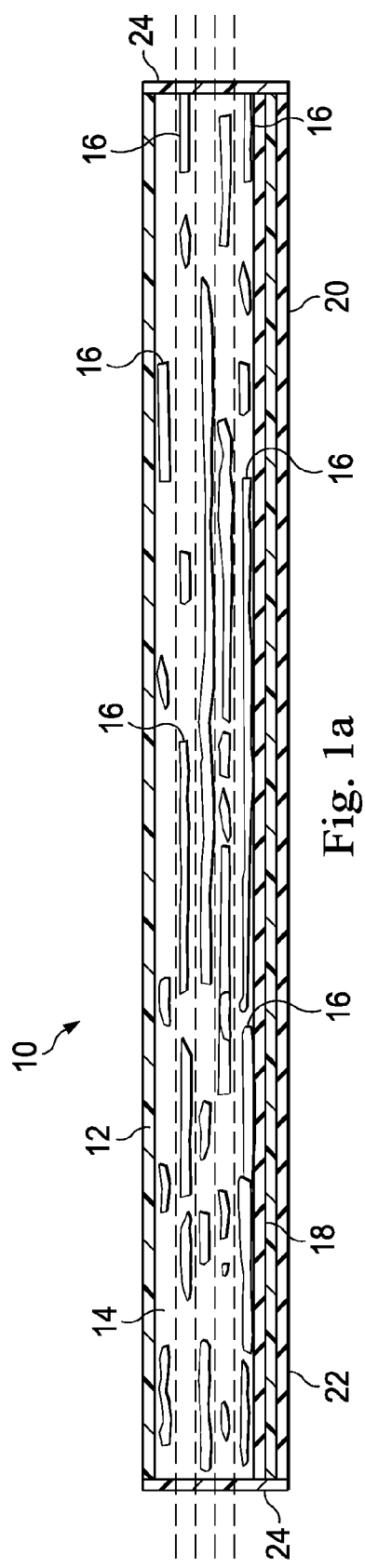

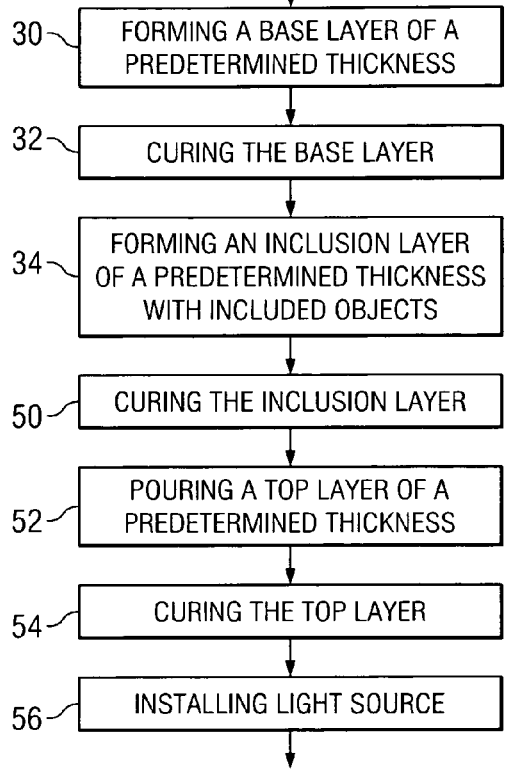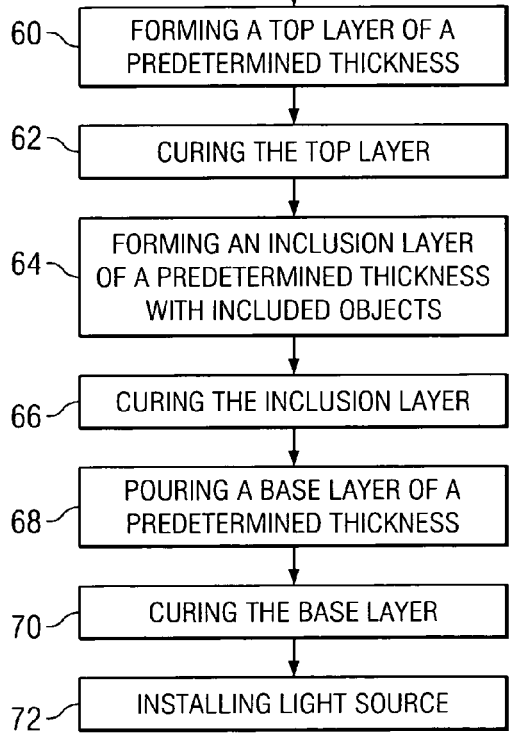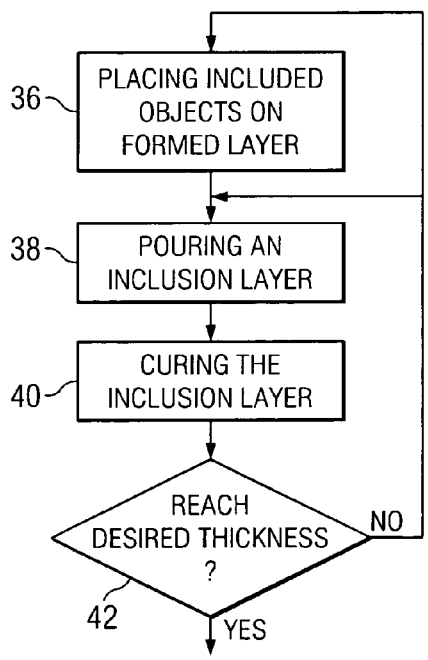

LAMINATE ASSEMBLY AND METHOD OF MANUFACTURE

RELATED APPLICATIONS

This patent application claims the benefit of U.S. provisional patent application, Application No. 60/519,180, filed on Nov. 11, 2003.

BACKGROUND

Laminate structures are used for a variety of purposes, such as countertops, tabletops, furniture, flooring, wall cladding, and windows. However, new types of laminate structures are generally desired by architects, interior designers, and others to produce new and unique products and designs to achieve the desired look and finish for these surfaces.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1 is a diagram FIG. 1a is a cross-sectional side view of an embodiment of a laminate assembly;

FIG. 2 is a simplified flowchart of an embodiment of a method of making the laminate assembly;

FIG. 3 is a simplified flowchart of another embodiment of a method of making the laminate assembly;

FIG. 4 is a more detailed flowchart of an embodiment of a method of making the inclusion layer of the laminate assembly;

DETAILED DESCRIPTION

Figure 1B:
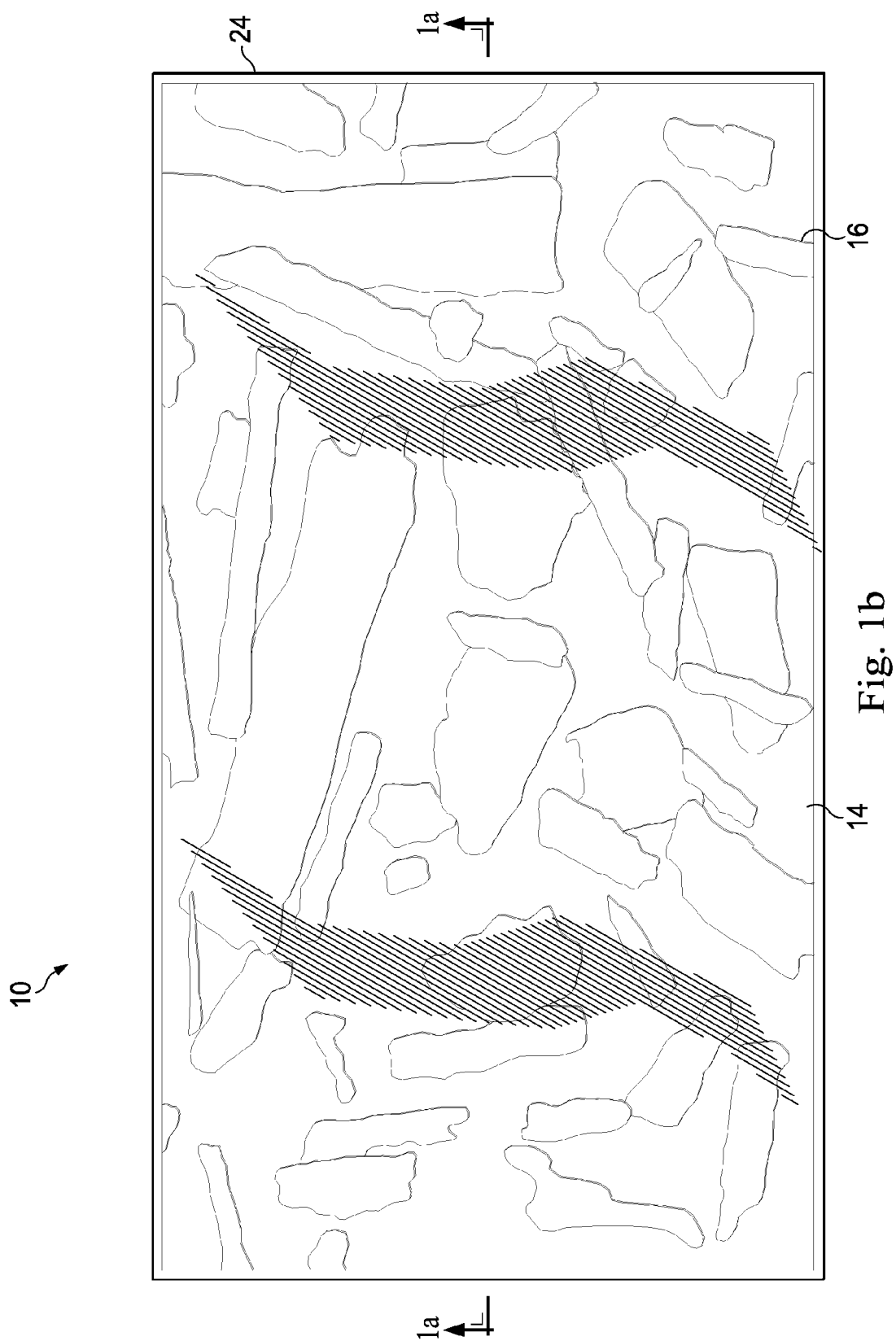
FIG. 1b is a plan view of an embodiment of a laminate assembly.
Figure 1C:
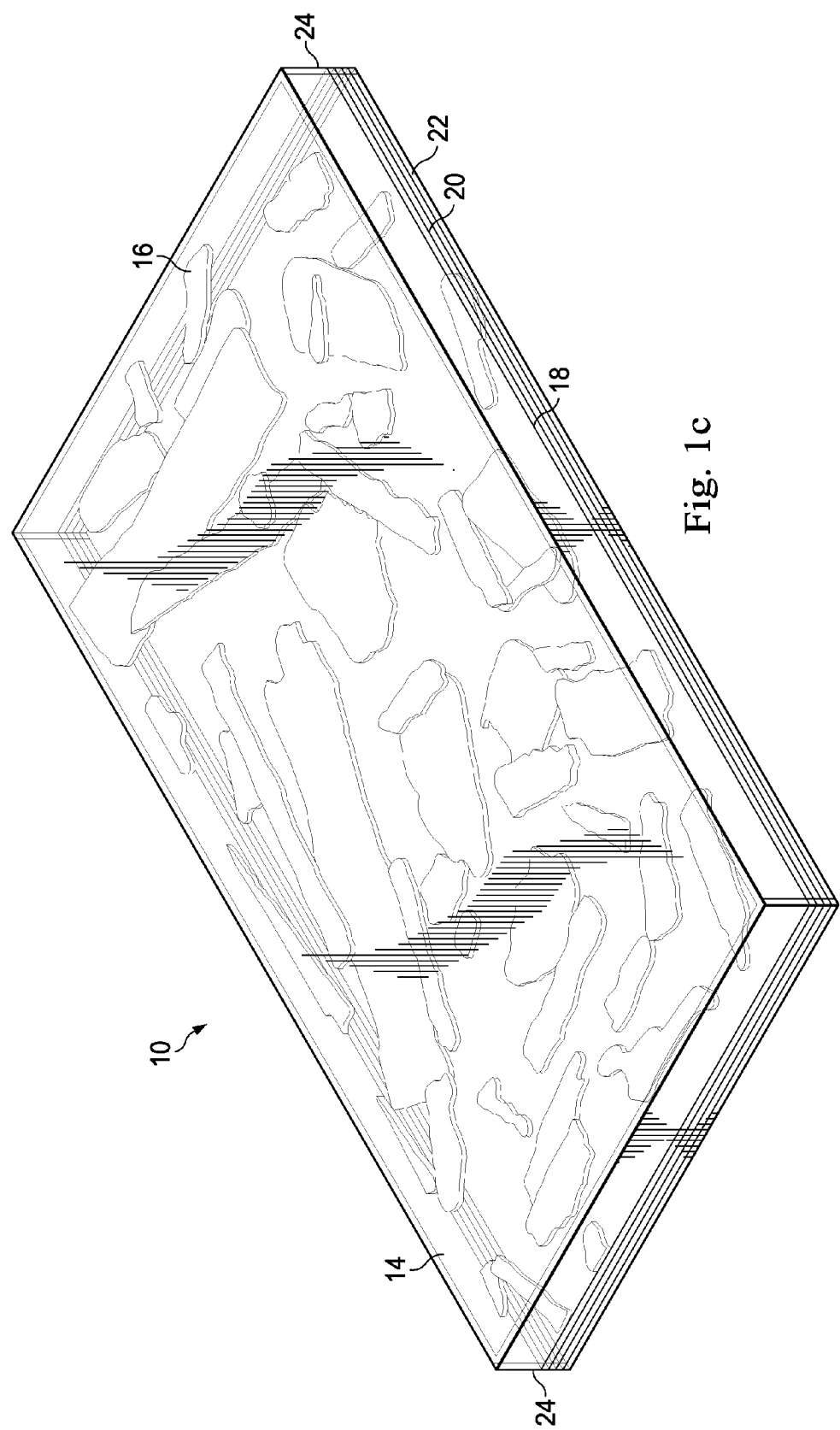
FIG. 1c is a perspective view of an embodiment of a laminate assembly.

Referring to FIGS. 1a-1c for a cross-sectional side view, plan view and perspective view of an embodiment of a laminate assembly 10, it may be seen that laminate assembly 10 comprises a multi-layer structure of an embodiment of a laminate assembly 10. Laminate assembly 10 comprises a multi-layer structure having one or more types of included objects disposed at varying depth of the assembly. According to one embodiment of laminate assembly 10, laminate assembly 10 comprises a top layer 12 disposed above an inclusion layer 14. Top layer 12 may be constructed of a material that is transparent or translucent that preferably provides protection against damage from ultraviolet light. Top layer 12 should also be constructed of a material that has adequate hardness to guard against scratches and scrapes, and against damage by mild cleaning solutions and heat. Top layer 12 is also preferably stain-resistant and does not yellow or fade with age. Top layer 12 may be an acrylic urethane coating, for example, or other suitable materials in combination with other resin compounds, catalysts, hardeners, and filler materials.

Inclusion layer 14 is bonded to top layer 12 and has a plurality of included objects 16 disposed at varying depths in a transparent or translucent material of a predetermined thickness. Included objects 16 may include glass, minerals, shells, semi-precious cut or uncut gems, and other natural and/or man-made objects. Included objects 16 may overlap one another in inclusion layer 14 at different depths. In one embodiment of laminated assembly 10, selenite mineral portions or slices are scattered at different depths in a polyester resin. In another embodiment, satin spar is used as included objects. The selenite portions have planes of flat surfaces that catch and reflect light. The pearlescent sheen of selenite makes the end laminate assembly product especially lovely. Selenite is a gypsum product that may be cleaved into pieces of varying sizes. The size of the included objects may be designed with the size of the overall laminate assembly in mind. For example, a laminate assembly to be used for a large span of wall cladding may have larger pieces of included objects than another laminate assembly designed for a bar countertop. The included objects, such as the selenite pieces, may be further processed to alter their appearance, such as being tinted with different colors. The transparent or translucent material layer may also carry a slight overall or localized tint. Inclusion layer 14 may be a polyester, for example, or other suitable materials in combination with other resin compounds, catalysts, hardeners, and filler materials.

It should be understood that the type and size of included objects 16 that may be employed in laminate assembly 10 are virtually limitless. The only physical limitation of its size is the thickness of inclusion layer 14 and the size of laminate assembly 10. The included objects in a laminate assembly may be somewhat uniform in size or may vary widely in size. Further, a laminate assembly may have included objects of the same type or different types, same color or different colors, etc.

Inclusion layer 14 is disposed above a base layer 18. Base layer 18 may be a translucent or opaque layer. Base layer 18 should be made out of a material that gives the laminate assembly structural integrity and would prevent the assembly from warping, shrinking and cracking. Base layer 18 may be an epoxy or a fiberglass layer, for example. Base layer 18 may be tinted to a predetermined color.

A light source 22 and/or 24 with an optional light diffuser 20 may be used to illuminate and visually enhance the appearance of laminate assembly 10. Light source 22 is disposed substantially below base layer 18 in a plane parallel to base layer 18 so that light emanating therefrom is directed perpendicularly into the parallel planes of layers 12, 14, and 18. Light source 24 is disposed substantially along one or more edges of laminate assembly 10 so that light emanating therefrom is directed in parallel into the parallel planes of layers 12, 14, and 18. Depending on the intensity of light source 24, its light may create an illuminated band into laminated assembly 10 along the lit edge. Light sources 22 and 24 may comprise a flat electroluminescent panel or a light assembly using light emitting diodes (LEDs), for example. The color and intensity of the light from light source 22 and 24 may be selected to achieve the desired overall appearance and effect. The color in the light source may even alternately change from one color to another or from one color combination to another color combination. Alternately, a light source that emits invisible light, such as ultraviolet light may be used in combination with florescent included objects in the inclusion layer to emit visible light therefrom. The laminate assembly may alternatively have substantially transparent and/or translucent layers that may be installed to enable ambient light or natural light to pass therethrough. For example, the laminate assembly may be used in a privacy window or other applications where the passage of sunlight or natural light and discreetness are both desired characteristics.

A light diffuser 20 may be sandwiched between the light source and the base layer and may be used to soften and diffuse the light to achieve a desired effect. In one embodiment, light diffuser 20 may be a low-density layer of sand of a desired thickness. In another embodiment, light diffuser 20 may be a gelatin filter that may alter the color of the light from light source 22 or 24. The light source and/or light diffuser may be bonded or adhered to the base layer or the assembly edges using suitable mechanical or chemical means, such as glue, adhesives, clamps, a frame holding the assembly, etc.

FIG. 2 is a simplified flowchart of an embodiment of a method of making the laminate assembly. Base layer 18 is first formed in block 30. This step may entail combining the base layer component materials and then pouring it into a mold. A mold release may be applied to the mold to facilitate releasing the formed laminate assembly from the mold. The mold may comprise a glass table to form a substantially planar and level surface. Alternatively, the mold may comprise a bottom surface that has a desired profile for the end product. Gravitational forces act to level base layer 18 within the mold. The base layer is then allowed to cure to a desired degree in block 32. An inclusion layer 14 is then formed on top of base layer 18 in block 34.

FIG. 4 is a more detailed flowchart of an embodiment of a method of making the inclusion layer of the laminate assembly. Inclusion layer 14 may be poured or formed in stages. In block 36, a plurality of included objects 16 are placed on top of base layer 18. Prior to placing the included objects in the mold, they may be "wetted" with the material that will form inclusion layer 14 to minimize the formation of bubbles and to prevent included objects from rising to the surface. The size and number of included objects 16 should be selected carefully to achieve a desired appearance and effect. Because the base layer is not completely cured, it may receive and hold the included objects in place oriented in a random manner. The inclusion layer material is then poured over the included objects in block 38. Preferably, the inclusion layer material has a thickness that substantially completely covers the included objects. The inclusion layer is then allowed to cure to a desired degree in block 40. If the desired thickness of the inclusion layer is reached 42, then the formation of the inclusion layer is completed. If the desired thickness has not been reached or some of the included objects are protruding from the level surface of the inclusion layer, then additional inclusion layer material and/or included objects are added to the mold in blocks 36 and 38 (as illustrated in FIG. 1*a* by the dashed line demarking portions of inclusion layer material and/or included objects), and allowed to cure to a certain desired degree in block 40. These steps are repeated until the desired thickness is reached and all of the included objects are substantially immersed within the inclusion layer.

It may be desirable to vibrate the mold and its contents during the pouring and/or curing process in forming the base layer and/or inclusion layer by using a shake table. Such vibrations may be able to eliminate or minimize the number and/or size of air bubbles therein. Acetone or another chemical product may be applied to the surface of inclusion layer to further eliminate any bubbles formed at the surface.

Returning to FIG. 2, after the formation of the inclusion layer, it is allowed to cure to a certain desired degree in block 50. A top layer 12 of a UV-resistant and durable material is then poured over or applied to the inclusion layer in the mold in block 52 to achieve coverage of the inclusion layer. The top layer is operable to prevent delamination of the multiple layers of the laminate assembly, prevent the included objects from rising to the surface, and improve the durability of the laminate assembly surface. The application of the top layer may be performed by spraying, brushing, pouring, and/or a combination of these methods. The top layer is then allowed to cure in block 54. The entire assembly may require some additional cure time prior to handling and/or removing it from the mold. One or more light sources may then be added to the laminate assembly either along a parallel plane adjacent to the base layer or along one or more edge of the laminate assembly in block 56.

FIG. 3 is a simplified flowchart of another embodiment of a method of making the laminate assembly. Instead of forming the base layer first, the laminate assembly may be constructed by forming top layer 12 first in block 60. A UV-resistant and scratch-resistant material such as acrylic urethane may be used to form top layer 12. The top layer is allowed to cure to a certain desired degree in block 62. An inclusion layer 14 with included objects 16 disposed at varying depth therein is then formed in block 64 as described in more detail above and shown in FIG. 4. The inclusion layer is then allowed to cure to a certain desired degree in block 66. A base layer 18 of a predetermined thickness is then formed on top of inclusion layer 14 in block 68. The base layer is then allowed to cure to a certain desired degree in block 70. The entire assembly may require some additional cure time prior to handling and/or removing it from the mold. One or more light sources may then be added to the laminate assembly either along a parallel plane adjacent to the base layer or along one or more edge of the laminate assembly in block 72.

Because the top layer and the inclusion layer materials are substantially transparent, the generally overlapping included objects resting at various depths in the inclusion layer are visible to users viewing the laminate assembly.

Another embodiment of laminate assembly comprises a substantially transparent inclusion layer with the included objects resting at various depths therein, and a durable substantially transparent top layer over the inclusion layer. It may also be contemplated that the laminate assembly comprises an inclusion layer without a base layer or a top layer.

Laminate assembly 10 may be used to form a variety of products and applications such as, but not limited to, countertops, tabletops, furniture, and wall cladding. Virtually any horizontal and vertical surfaces in a commercial or residential environment may employ this laminate assembly to significantly enhance its appearance. Depending on the objects included in laminate assembly, different moods may be imparted. Organic, inorganic, natural, manmade objects in homogeneous compositions, sizes and shapes may be used. For example, precious and semiprecious minerals, pearls, mother of pearl, and other materials with a luster may impart beauty and elegance. Florescent and/or phosphorescent minerals or materials may also be used as included objects to achieve a particular desired appearance. UV light sources may be used with laminate assemblies with florescent included objects so that visible light are emitted thereby.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A laminate assembly comprising:
   a base layer being formed of a first resin material;
   at least one substantially transparent inclusion layer formed of a second resin material, the inclusion layer being disposed above and cured directly onto the base layer such that the inclusion layer is integrally formed with the base layer, the inclusion layer having a heterogeneous composition of a plurality of overlapping included objects disposed within the at least one substantially transparent inclusion layer, the included objects being arranged such that at least a first portion of the included objects is oriented in a direction that is visually askew from a direction of orientation of a second portion of the included objects; and a substantially transparent top layer formed of a third resin material, the top layer being disposed above and cured directly onto the inclusion layer such that the transparent top layer is integrally formed with the inclusion layer, wherein each included object in the included objects has a size within the at least one substantially transparent inclusion layer such that the included object is individually perceivable by the naked human eye.

2. The laminate assembly of claim 1, further comprising a substantially flat light source disposed below the base layer and operable to direct light perpendicularly into the base layer, inclusion layer, and top layer.

3. The laminate assembly of claim 2, further comprising a light diffusing layer disposed between the light source and the base layer.

4. The laminate assembly of claim 3, wherein the light diffusing layer further modifies the color of light emanating from the light source.

5. The laminate assembly of claim 1, further comprising a light source disposed along an edge of the laminate assembly and operable to direct light in parallel of the base layer, inclusion layer, and top layer.

6. The laminate assembly of claim 1, wherein the base layer is substantially translucent.

7. The laminate assembly of claim 1, wherein the base layer is substantially transparent.

8. The laminate assembly of claim 1, wherein the base layer is substantially opaque.

9. The laminate assembly of claim 1, wherein the plurality of included objects of the inclusion layer comprises a composition of similar-sized overlapping included objects.

10. The laminate assembly of claim 1, wherein the inclusion layer comprises a composition of different-sized overlapping included objects.

11. The laminate assembly of claim 1, wherein the inclusion layer comprises a composition of at least one included object.

12. The laminate assembly of claim 1, wherein the inclusion layer comprises a plurality of overlapping selenite portions.

13. The laminate assembly of claim 1, wherein the inclusion layer comprises a plurality of overlapping mineral portions.

14. The laminate assembly of claim 1, wherein the inclusion layer comprises a plurality of overlapping organic included objects.

15. The laminate assembly of claim 1, wherein the inclusion layer comprises a plurality of overlapping manmade included objects.

16. The laminate assembly of claim 1, wherein the top layer and inclusion layer comprise a urethane polymer.

17. The laminate assembly of claim 1, further comprising a light source disposed below the base layer, the light source being selected from a group consisting of a flat electroluminescent panel and light emitting diodes.

18. The laminate assembly of claim 1, wherein the top layer and inclusion layer are substantially translucent.

19. A laminate assembly comprising:

a base layer structurally configured in a manner that provides structural integrity to the laminate assembly by preventing warping, shrinking, and cracking of the laminate assembly, the base layer being formed of a first resin material;

at least one inclusion layer formed of a second resin material, the inclusion layer being disposed above and cured directly onto the base layer such that the inclusion layer is integrally formed with the base layer, and having a heterogeneous composition of a plurality of overlapping included objects disposed within the at least one inclusion layer such that at least a first portion of the included objects is oriented in a direction that is visually askew from a direction of orientation of a second portion of the included objects;

a substantially transparent top layer formed of a third resin material, the top layer being disposed above and cured directly onto the at least one inclusion layer such that the transparent top layer is integrally formed with the inclusion layer, where the base layer is visible between the included objects and through the transparent inclusion layer and the transparent top layer; and a light source disposed adjacent to at least the base layer operable to emit light through at least one of the layers of the assembly and illuminate the plurality of included objects in the at least one inclusion layer, wherein each included object in the included objects has a size within the at least one substantially transparent inclusion layer such that the included object is individually perceivable by the naked human eye.

20. The laminate assembly of claim 19, wherein the base layer is substantially translucent.

21. The laminate assembly of claim 19, wherein the inclusion layer comprises a composition of overlapping included objects.

22. The laminate assembly of claim 19, wherein the top layer comprises a urethane.

23. The laminate assembly of claim 19, wherein the top layer comprises a polymer.

24. The laminate assembly of claim 19, wherein the base layer comprises fiberglass.

25. The laminate assembly of claim 1, wherein the at least one inclusion layer comprises at least one layer of a homogeneous composition of similar-sized overlapping mineral pieces disposed at varying depths within the inclusion layer.

26. The laminate assembly of claim 1, wherein the inclusion layer has an overall thickness greater than a thickness of the included objects such that the included objects are completely embedded in the resin forming the inclusion layer.

27. The laminate assembly of claim 1, wherein the base layer is tinted to a predetermined color.

28. A laminate assembly comprising:

a base layer formed of a first resin material;

at least one substantially transparent inclusion layer formed of a second resin material, the inclusion layer being disposed above and cured directly onto the base layer such that the inclusion layer is integrally formed with the base layer, the inclusion layer having a heterogeneous composition of a plurality of overlapping included objects disposed therein in a first object layer and a second object layer, at least some of the objects in the first and second object layers overlapping each other and being disposed such that at least a first portion of the included objects is oriented in a direction that is visually askew from a direction of orientation of a second portion of the included objects; and a substantially transparent top layer formed of a third resin material, the top layer being disposed above and cured directly onto the inclusion layer such that the transparent top layer is integrally formed with the inclusion layer, wherein each included object in the included objects has a size within the at least one substantially transparent inclusion layer such that the included object is individually perceivable by the naked human eye.

29. The laminate assembly of claim 1, wherein:

the at least one substantially transparent inclusion layer includes a first portion of the inclusion layer having at least the first portion of the included objects positioned therein, and a second portion of the inclusion layer having at least the second portion of the included objects positioned therein, the first portion of the inclusion layer is fabricated by depositing a first portion of the second resin material on the base layer, depositing at least the first portion of the included objects in the first portion of the second resin material, and curing the first portion of the second resin material, and the second portion of the inclusion layer is fabricated by depositing a second portion of the second resin material on the first portion of the second resin material, depositing at least the second portion of the included objects in the second portion of the second resin material, and curing the second portion of the second resin material.

30. The laminate assembly of claim 19, wherein:

the at least one substantially transparent inclusion layer includes a first portion of the inclusion layer having at least the first portion of the included objects positioned therein, and a second portion of the inclusion layer having at least the second portion of the included objects positioned therein, the first portion of the inclusion layer is fabricated by depositing a first portion of the second resin material on the base layer, depositing at least the first portion of the included objects in the first portion of the second resin material, and curing the first portion of the second resin material, and the second portion of the inclusion layer is fabricated by depositing a second portion of the second resin material on the first portion of the second resin material, depositing at least the second portion of the included objects in the second portion of the second resin material, and curing the second portion of the second resin material.

* * * * *